(12) United States Patent
Idei et al.

(10) Patent No.: US 7,416,061 B2
(45) Date of Patent: Aug. 26, 2008

(54) BRAKE MEMBER AND BONDING METHOD

(75) Inventors: Hiroshi Idei, Tokyo (JP); Sho Kurihara, Tokyo (JP); Yoshiyuki Sugai, Tokyo (JP); Katsuhiro Kikuchi, Tokyo (JP); Yoshihiro Aoyagi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 11/729,917

(22) Filed: Mar. 30, 2007

(65) Prior Publication Data

US 2007/0227842 A1    Oct. 4, 2007

(30) Foreign Application Priority Data

Mar. 31, 2006  (JP) ............... P.2006-100653
Jan. 30, 2007  (JP) ............... P.2007-019761

(51) Int. Cl.
*F16D 69/00*    (2006.01)

(52) U.S. Cl. ................ 188/251 A; 156/89.25

(58) Field of Classification Search ........... 188/251 M, 188/251 A, 250 B; 264/29.1–29.7; 156/89.25–89.26; 523/156

See application file for complete search history.

(56) References Cited

U.S. PATENT DOCUMENTS

| | | | | |
|---|---|---|---|---|
| 3,477,551 A | * | 11/1969 | Beuchle et al. | 188/250 B |
| 4,352,750 A | * | 10/1982 | Eschen | 523/156 |
| 4,808,275 A | * | 2/1989 | Ohzora et al. | 205/109 |
| 6,364,072 B1 | * | 4/2002 | Grupp et al. | 188/165 |
| 7,067,077 B2 | * | 6/2006 | Gray | 264/29.2 |
| 7,261,846 B2 | * | 8/2007 | Bauer et al. | 264/291 |

* cited by examiner

*Primary Examiner*—Christopher P Schwartz
(74) *Attorney, Agent, or Firm*—Finnegan, Henderson, Farabow, Garrett & Dunner, L.L.P.

(57) ABSTRACT

In a brake member having a brake lining bonded to a brake shoe, the brake shoe has a chemical conversion coating provided on the surface thereof and a ceramics coating layer provided on the chemical conversion coating which has been formed by dipping in a ceramics precursor solution. The brake lining is bonded to the ceramics coating layer by heating under pressure. A method for bonding a brake lining and a brake shoe is provided with a step of degreasing, cleaning and acid-washing the surface of a brake shoe and then forming a chemical conversion coating thereon, a step of dipping the brake shoe having a chemical conversion coating formed thereon in a ceramics precursor solution to effect ceramics coating and a step of bonding a dried brake lining to the brake shoe under heating and pressure.

6 Claims, 1 Drawing Sheet

BRAKE MEMBER AND BONDING METHOD

This application claims foreign priority from Japanese Patent Application Nos. 2006-100653 filed on Mar. 31, 2006, and 2007-019761 filed on Jan. 30, 2007, the entire contents of which are hereby incorporated by reference.

BACKGROUND OF THE INVENTION

1. Field of the Invention

The present invention relates to a method of bonding a metallic base member and a lining and a brake member obtained by the method. In the method, since an organic solvent is not used in a bonding process, it is prevented from production and volatilization of organic gas, and thereby it is provided an environmentally friendly method and a stabilized bonding quality. More particularly, the present invention relates to a method for bonding a metallic base member and a lining which causes no environmental pollution due to organic solvent and can produce a metallic base member and a lining having the same or higher rustproofness than that obtained by chemical conversion in combination with primer treatment and a stabilized adhesivity and a brake member obtained by the method.

2. Related Art

In the related art method for bonding a metallic base member and a lining, the metallic base member is subjected to surface treatment involving degreasing and rust removal at a cleaning step, an acid washing step and chemical conversion step, and coating at a chemical conversion step, and then to primer treatment for formation of thin resin film. In this manner, the metallic base member can be entirely enhanced in its rustproofness and adhesivity to the lining.

However, the primer treatment involves a dipping of the metallic base member in a solution having a resin dissolved in an organic solvent. As such an organic solvent, there is used a solvent having a high volatility such as MEK (methyl ethyl ketone), methanol and toluene. Further, these organic solvents can evaporate much from the processing tank.

Moreover, the metallic base member is usually suspended from a dedicated hanger during the treatment. When the metallic base member is subjected to the primer treatment, the primer is attached to the hanger as well as the metallic base member. Therefore, the hanger is always or regularly washed with an organic solvent so as to remove the primer from the hanger. A large amount of a volatile solvent is also used at this step.

As the regulation on VOC (volatile organic compound) becomes severer, the use of such an organic solvent at a surface treatment step of the metallic base member will be a great problem.

SUMMARY OF THE INVENTION

One or more embodiments of the present invention provide an environmentally friendly method for surface-treating and bonding a metallic base member and a lining capable of eliminating a necessity of an organic solvent causing the volatilization of organic gas resulting in environmental pollution at a step of surface-treating the metallic base member and the step of bonding the metallic base plate and the lining, and thus producing the metallic base member and the lining having a stabilized bonding quality and the same or higher rustproofness than that obtained by related art method.

The method of the invention may be used to manufacture a brake member, such as a brake pad and a brake shoe, which is installed in a brake device of such as a vehicle.

In one or more embodiments of the present invention, when a metallic base member is subjected to ceramics coating after a formation of chemical conversion coating as surface treatment, a bonded product of the metallic base member and the lining having the same or higher rustproofness than that obtained by related art primer treatment can be obtained, even when a formation of a resin film by primer treatment is not effected.

In accordance with one or more embodiments of the present invention, a brake member is provided with: a metallic base member; a chemical conversion coating provided on a surface of the metallic base member; a ceramics coating layer provided on the chemical conversion coating and formed by dipping the metallic base member with the chemical conversion coating in a ceramics precursor solution; and a lining bonded to the ceramics coating layer by heating under pressure.

In the brake member, the metallic base member may be a shoe main body of a brake shoe of a drum brake, and the lining may be a brake lining.

In the brake member, the metallic base member may be a pressure plate of a brake pad of a disc brake, and the lining may be a brake lining.

Further, in accordance with one or more embodiments of the present invention, a method of bonding a lining to a metallic base member is provided with: a step of degreasing, cleaning and acid-washing a surface of a metallic base member and then forming a chemical conversion coating on the surface of the metallic base member; a step of dipping the metallic base member with the chemical conversion coating in a ceramics precursor solution to form a ceramics coating; and a step of bonding a lining to the metallic base member under heating and pressure, after drying the metallic base member.

In the method, the ceramics precursor solution may include a silane-based, titanium-based or aluminum-based metal alkoxide or silane-based or titanium-based coupling agent and a water-soluble or water-emulsifiable thermoplastic resin.

In the method, in the bonding step, the metallic base member with the ceramics coating may be bonded to the lining with no primer layer provided interposed therebetween.

In accordance with one or more embodiments of the present invention, the pretreatment step from degreasing step to bonding step can be carried out merely by a treatment in a water-soluble agent free of any organic solvent to provide rust preventing properties which are the same as or higher than that attained by chemical conversion coating and primer treatment in combination. Further, since the method of the embodiments requires no primer treatment, the attachment of organic matters to hanger can be prevented, making it possible to abolish the cleaning of hanger with a solvent.

Further, when the ceramic coating step involves a step of dipping the brake shoe in a ceramics precursor solution containing a silane-based, titanium-based or aluminum-based metal alkoxide or silane-based or titanium-based coupling agent and a water-soluble or water-emulsifiable thermoplastic resin to effect ceramics coating, the strength of the brake shoe having a brake lining bonded thereto can be enhanced.

Other aspects and advantages of the invention will be apparent from the following description and the appended claims.

DETAILED DESCRIPTION OF THE EXEMPLARY EMBODIMENTS

Figure 1:
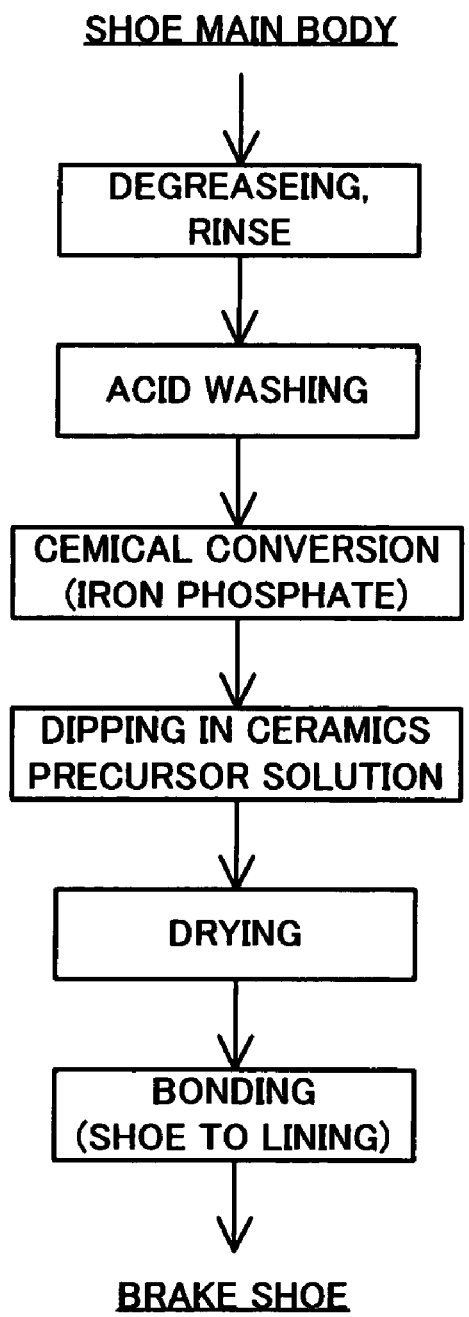
FIG. 1 is a flow chart illustrating the main production steps of the brake materials of Example 1 of the invention and Comparative Example 1.
Figure 1:
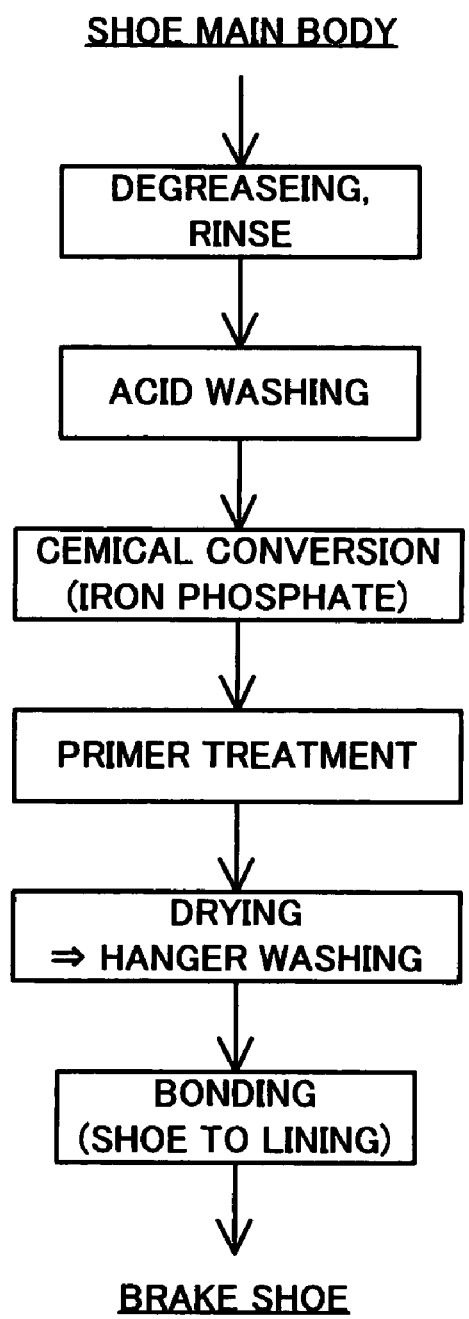

An exemplary Embodiment the invention will be described hereinafter.

In the exemplary embodiment described hereinafter, the method of the invention is applied to a manufacturing a brake member used in a vehicle brake. The vehicles include two-wheeled vehicles besides four-wheeled automobiles. The vehicle brake is provided with the brake member. The brake member is provided with a metallic base member and a lining. In a drum brake which is one type of brakes used in the four-wheeled automobiles or the two-wheeled vehicles, the brake member is to a brake shoe, and the brake shoe is provided with a shoe main body and a brake lining. Further, in a disc brake which is another type, the brake member is a brake pad, and the brake pad is provided with a pressure plate and a brake lining.

The brake member of the invention may be applied not only to the brake shoe of the drum brake but also to various brake member such as the brake pad of the disc brake. Although the invention is applied to the brake shoe in the exemplary embodiment, the invention can be applied to other brake member than the brake member in the exemplary embodiment.

When the shoe main body (the metallic base member) is subjected to chemical conversion treatment, a phosphate film is formed on a surface of a metal sheet. A formation of the phosphate film makes it possible to raise a surface energy as well as a bonding area.

Examples of the phosphate film include iron phosphate film, manganese phosphate film, and zinc phosphate film.

After the formation of phosphate film, the shoe main body is dipped in a ceramics precursor solution which had been previously prepared, withdrawn from the ceramics precursor solution at a constant rate, and then passed through a drying step to undergo ceramics coating.

The ceramics precursor which can be preferably used in the exemplary embodiment is an organic metal ceramics precursor. Such an organic metal ceramics precursor is a material known in the art of ceramic work. Such a material may be in the form of any of solvent-soluble solid, fusible solid and curable liquid. Further, the aforementioned precursor may be any of monomer, oligomer and polymer.

Examples of the organic metal ceramics precursor binder suitable for the implementation of the exemplary embodiment include monomers, oligomers, and polymers. The term "organic metal" as used herein is meant to indicate a composition containing a metal-carbon bond. Suitable examples of the metal include both metal selected from the group consisting of elements belonging to the groups 1 to 15 of IUPAC periodic table and main group and transition metals selected from the group consisting of metalloids. Preferred examples of metals and metalloids include titanium, zirconium, silicon, and aluminum. Particularly preferred among these metals and metalloids is silicon.

The ceramics precursor in the form of monomer can satisfy requirements for the implementation of the exemplary embodiment. However, most monomers which can be polymerized to produce a polymer having a sufficient ceramic yield (e.g., higher than 20% by weight) have so low a molecular weight as to cause volatility problem at a proper drying temperature. One of the examples of such a monomer is vinyl trimethylsilane, the boiling point of which is as low as 55° C. The curing of this monomer involving the production of ceramics coating by a heating/drying method requires a temperature higher than the boiling point of this monomer. Accordingly, this monomer is not suitable for the process of the invention. In general, a monomer is too volatile for use in the coating production process. Therefore, the liquid ceramics precursor to be used in the invention is preferably an oligomer or polymer.

The organic metal ceramics precursor suitable for the implementation of the exemplary embodiment preferably contains an organic saturated group such as alkenyl group, alkinyl group, epoxy group, acrylate group and methacrylate group. Such a group can accelerate the organic metal ceramics precursor when the organic metal ceramics precursor is supplied with an energy in the form of heat or ultraviolet ray or laser energy to accelerate the crosslinking mechanism of free radical or ion in the organic unsaturated group. Such a crosslinking reaction accelerates rapid curing to produce a cured coating having a high ceramic yield after thermal decomposition. Specific examples of such a precursor include poly(acryloxypropylmethyl)siloxane, glycidoxypropylmethyl methylsiloxane copolymer, polyvinyl methylsiloxane, poly(methylvinyl)silazalane, 1,2,5-trimethyl-1,3,5-trivinylsilazalane, 1,3,5,7-tetramethyl-1,3,5,7-tetravinyltetrasilazalane, 1,3,5-tetravinyl tetramethylcyclotetrasiloxane, tris(vinyldimethyl siloxane)methylsilane, trivinylmethylsilane, and tetraethoxysilane.

In order to dip the shoe main body in the ceramics precursor solution, the shoe main body is suspended from a hanger, and then put in the ceramics precursor solution. After being dipped for 1 minute, the brake shoe is withdrawn from the ceramics precursor solution at a constant rate, e.g., 800 mm/min, dried, and then heated to 100° C. for 10 minutes to form a coating film thereon.

The dipping may be repeated a plurality of times. In the case where the dipping is effected a plurality of times, the dipping may be repeated in a plurality of solutions having different formulations or concentrations so that the coating can be finally adjusted to desired formulation or thickness. In the dipping step, there may be cases that the ceramics precursor solution is adhered to the hanger. However, since a thickness of an adhesion is a thin film of several tens to several hundreds nm (nano meter), the film is separated and removed when the hanger is used in a pre-treatment (acid-washing) in a process of a next time. Therefore, the adhesion of the ceramics precursor solution should not be a problem like a primer processing.

An adhesive may be coated any of the shoe main body and the lining. In the exemplary embodiment, the brake lining is coated with the adhesive. As such an adhesive, there is used a solvent type or powdered thermosetting adhesive. As such a thermosetting adhesive, there is preferably used a composite type thermosetting adhesive. As a composite type thermosetting adhesive capable of bonding the surface of metal to a porous material with a sufficient adhesion, there can be exemplified a thermosetting resin-modified thermosetting adhesive or elastomer-modified thermosetting adhesive.

Examples of the thermosetting resin-modified thermosetting adhesive employable herein include polyvinyl butyral/phenolic, polyvinyl formal/phenolic, nylon/phenolic, polyvinyl acetate/phenolic, polyamide/epoxy, acryl/epoxy, aniline/epoxy, and polyester/epoxy.

Examples of the elastomer-modified thermosetting adhesive employable herein include NBR/phenolic, chloroprene/phenolic, silicone/phenolic, polyurethane/phenolic, NBR/epoxy, and polyurethane/epoxy.

As the phenolic resin there may be used resol or hexamine-containing novolac. As an electrostatic step of spreading a powdered adhesive there may be employed an external electrostatic process (corona charging gun) or internal electrostatic process (triboelectric charging gun).

When this charging process is effected to cause the thermoplastic adhesive particles to be attached to the brake lining, the percent recovery of adhesive can be raised to about 90%.

Further, the use of a particulate (powdered) adhesive makes it possible to eliminate the necessity of solvent and prevent environmental pollution, reduce the time required for the step of drying the adhesive and prevent the drop of strength.

While the aforementioned bonding process has been described with reference to the case where a particulate adhesive is used, other forms of adhesive may be used to make easy bonding.

In the related art technique, it has been practiced to bond the surface-treated shoe main body and the lining coated with an adhesive to each other after the spreading of a primer over the surface of the brake shoe. In the exemplary embodiment, however, the shoe main body and the lining can be immediately heated under pressure with an adhesive band with no primer layer provided on the shoe main body to obtain a bonding product of the two components. The adhesivity between the two components is sufficiently great even when no primer layer is provided on the shoe main body.

The curing of the adhesive is preferably effected at a temperature of from 150° C. to 300° C. and a pressure of from 0.5 to 1.5 MPa for 1 minute to 10 hours, more preferably at a temperature of from 180° C. to 250° C. and a pressure of from 0.8 to 1.0 MPa for 10 minutes to 2 hours.

EXAMPLE

The invention will be further described in detail in the following examples, but the invention is not limited thereto.

(1) Formation of Ceramics Film on Shoe Main Body

Example 1

A shoe main body was subjected to chemical conversion coating to form an iron phosphate film (film weight: 0.4 to 0.8 g/m$^2$), dipped in a ceramics precursor solution which had been previously prepared in the following manner, and then dried at 100° C. for 10 minutes.

The ceramics precursor solution was prepared by mixing TEOS (tetraethoxysilane) and acetic acid at a molar ratio of 1:4 with water as a solvent, adding PVA (polyvinyl alcohol) to the mixture in such an amount that the proportion in the coating reaches 5 wt-%, and then concentrating the mixture at 70° C. for 3 hours until the concentration of the precursor reached 1 mol/l.

After being dipped in the ceramics precursor solution, the shoe main body was then withdrawn therefrom at a certain speed (800 mm/min) to form a coating thereon.

Comparative Example 1

For comparison, a shoe main body which had an iron phosphate film (film weight: 0.4 to 0.8 g/m$^2$) formed thereon was subjected to primer treatment.

The primer was made of a polyvinyl butyral-modified phenolic resin and had a thickness of from 2 μm to 7 μm.

(2) Preparation of Shoe-Lining Bonded Product

The shoe main body thus surface-treated and the lining having an adhesive spread thereon were bonded to each other with an adhesive band at a pressure of 8 kg/cm$^2$ and 200° C. for 1 hour to prepare a bonded product.

Adhesive: PL-605-50 (produced by THE YOKOHAMA RUBBER CO., LTD.) (NBR-modified phenolic resin)

The process chart of Example 1 and Comparative Example 1 will be shown in FIG. 1.

(3) Evaluation of Corrosion Resistance and Adhesivity

The results of evaluation of corrosion resistance and adhesivity of the bonded products prepared in Example 1 and Comparative Example 1 will be set forth in Tables 1 and 2, respectively.

As can be seen in the results of evaluation of corrosion resistance, the brake member (the shoe main body having the lining bonded thereto) obtained by the surface treatment and bonding method of the invention is so excellent that it cannot undergo rusting or the like resulting in corrosion when used as a drum brake in the drum of four-wheeled automobiles.

A further result was obtained that the brake of Example 1 has the same corrosion resistance and adhesivity as that of the comparative example.

Although the present invention is applied to the brake member of the drum brake in the present example, similar effects were obtained when the invention is applied to a brake member (brake pad) of a disc brake.

TABLE 1

Table 1: Results of evaluation of corrosion resistance (continuous salt spray test: JIS)

|  | Example 1 | Comparative Example 1 |
|---|---|---|
| Time required for generation of red rust | 5 H | 5 H |

TABLE 2

Table 2: Results of shearing test (JASO) (unit: MPa)

|  | Example 1 | Comparative Example 1 |
|---|---|---|
| Ordinary temperature | 4.3 to 5.6 | 4.5 to 5.4 |
| High temperature (300° C.) | 1.8 to 2.4 | 1.8 to 2.7 |

In accordance with the method for bonding a metallic base member and a lining of the invention and the brake member thus obtained, none of the steps require the use of organic solvent that generates a volatile gas causing environmental pollution. Thus, the bonding method of the invention can be effected in a line suitable for environmental protection. Further, a brake having an excellent rustproofness and a high adhesivity can be produced. The brake thus produced can be expected to find wide application in the art of passenger car, industrial machine, railway vehicle, two-wheeled vehicle, etc.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A brake member comprising:
   a metallic base member;

a chemical conversion coating provided on a surface of the metallic base member;

a ceramics coating layer provided on the chemical conversion coating; and a lining bonded to the ceramics coating layer by heating under pressure.

2. The brake member according to claim 1, wherein the metallic base member comprises a shoe main body of a brake shoe of a drum brake, and the lining comprises a brake lining.

3. The brake member according to claim 1, wherein the metallic base member comprises a pressure plate of a brake pad of a disc brake, and the lining comprises a brake lining.

4. A method for bonding a lining to a metallic base member comprising:

degreasing, cleaning and acid-washing a surface of a metallic base member and then forming a chemical conversion coating on the surface of the metallic base member;

dipping the metallic base member with the chemical conversion coating in a ceramics precursor solution to form a ceramics coating; and bonding a lining to the metallic base member under heating and pressure, after drying the metallic base member.

5. The method according to claim 4, wherein the ceramics precursor solution includes a silane-based, titanium-based or aluminum-based metal alkoxide or silane-based or titanium-based coupling agent and a water-soluble or water-emulsifiable thermoplastic resin.

6. The method according to claim 4, wherein in the bonding step, the metallic base member with the ceramics coating is bonded to the lining with no primer layer provided interposed therebetween.

* * * * *